3,352,861
PROCESS FOR THE RECOVERY OF ACETOGUANAMINE

Clyde H. Bell, Chattanooga, Tenn., assignor to Velsicol Chemical Corporation, Chattanooga, Tenn., a corporation of Tennessee
No Drawing. Filed Dec. 15, 1965, Ser. No. 514,098
5 Claims. (Cl. 260—249.9)

This invention relates to the production of acetoguanamine. In particular this invention relates to the preparation of crystalline acetoguanamine.

Various processes have been described in the literature for the preparation of acetoguanamine. These processes are effective in the production of this chemical and have found commercial acceptance.

Unfortunately it has been found that in these known procures the acetoguanamine is a fine powder and that it often contains substantial amounts of impurities.

Normally the catalysts and other impurities in the acetoguanamine reaction product are water soluble, making desirable a step wherein acetoguanamine is separated from a water solution of the contaminants. The product so obtained contains large amounts of residual water and proportionally large amounts of the water soluble impurities. When removed from the water slurry, and partially dried, the acetaoguanamine tends to agglomerate into large lumps, making further drying difficult. When completely dry, the portion not agglomerated is an extremely fine, dusty powder.

Accordingly, it is an object of the present invention to recover acetoguanamine by an efficient procedure and in a crystalline form.

It is still another object of the present invention to recover acetoguanamine in an efficient manner resulting in an anhydrous product.

Other objects of the present invention will become apparent from the ensuing description.

As has been previously stated, the literature does describe procedures for the preparation of acetoguanamine. Reference in this matter is made to United States Patent 2,302,162, entitled Process for Producing Guanamine Derivatives, United States Patent 2,792,395, entitled Preparation of Guanamines, United States Patent 2,527,314, entitled Production of Guanamines, United States Patent 2,735,850, entitled Preparation of Guanamines, United States Patent 2,777,848, entitled Method of Preparing Guanamines, and British patent specification No. 642,409, entitled Improvements in or Relating to the Preparation of Guanamines.

Each of these patents is concerned with the preparation of guanamines in general. Each of the patents describes procedures which can be used to prepare acetoguanamine. Unfortunately, these processes can result in the preparation of a hydrous product of fine or powdery particle size.

In essence these patents describe variations for preparing acetoguanamine by reacting dicyandiamide and acetonitrile in an alkaline reaction medium. The various patents are concerned with alkaline medium to be used, catalysts and solvents. Each of these patents describes reaction conditions which will result in acetoguanamine product.

United States Patent 2,446,980, entitled Process for Preparing Guanamines, describes in part a procedure for preparing acetoguanamine by reacting a biguanide salt with an acetic anhydride or acid.

United States Patent 2,408,694, entitled Method of Preparing Acyl Guanidines, discloses a procedure for preparing acetaguanamine by reacting guanadine carbonate with an alkali metal followed by reaction with an ester of acetic acid.

It has now been found that in order to produce acetoguanamine in high yields and as a crystalline substance of high purity, it is important that the recovery medium containing acetoguanamine, water and impurities not be allowed to cool below a temperature of about 35° C. before the acetoguanamine and water are separated from each other.

As mentioned the water is usually introduced during the recovery step but could be introduced as an impurity in the raw materials or reaction solvent. Acetoguanamine can also be prepared with water as the solvent.

The precise procedure for removing the water can vary and normal procedures for this purpose can be employed. Two effective procedures are filtration or centrifugation. This would remove substantially all of the water from the acetoguanamine-water system. In removing the water most of the water soluble impurities will also be removed. Washing the acetoguanamine precipitate on the filter or centrifuge at a temperature above about 35° C. with additional water can result in an even purer product.

After removal of slurry water and wash water residual surface water can be removed by conventional drying methods to obtain a white free flowing crystalline product.

For additional recovery of acetoguanamine the filtrate from filtration or centrifugation of the original recovery medium can be cooled below about 35° C. to precipitate out additional acetoguanamine. This hydrated acetoguanamine can also be recovered by known means such as centrifuging or filtering and then added to the wash water from the original filtration or centrifugation. This wash water, with a significant concentration of acetoguanamine, can then be used as part or all of the aqueous recovery medium for a succeeding bath. The following examples illustrate the performance of the present invention:

Example 1

An aqueous slurry of acetoguanamine (240 grams) obtained by reacting dicyandiamide and acetonitrile in an alkaline reaction medium including as impurities unused reactants, catalyst and by-products and water (300 grams) was cooled to 45° C. and filtered. The filter cake was washed with water (500 grams) at 45° C. and the final filter cake contained 17% water. This filter cake was dried in a vacuum oven and the dry acetoguanamine (205 grams) was recovered. This product was crystalline and free flowing. Only 6 weight percent passed through a 250 mesh screen. The dried acetoguanamine had a freeze point of >273° C. It was very slightly brown when melted and it was resistant to decomposition when held at its melt point.

Example 2

An aqueous slurry of acetoguanamine (240 grams) obtained by reacting dicyandiamide and acetonitrile in an alkaline reaction medium including as impurities unused reactants, catalyst and by-products and water (200 grams) was cooled to 45° C. and centrifuged. The centrifuge cake was washed on the centrifuge with water (200 grams) at 45° C. and the final centrifuged cake contained 3.5% water. This filter cake was dried in a vacuum oven and the dry acetoguanamine (215 grams) was recovered. This product was crystalline and free flowing. Only 8 weight percent passed through a 250 mesh screen. The dried acetoguanamine had a freeze point of >273° C. It was virtually colorless when melted and it was resistant to decomposition when held at its melt point.

Example 3

A super saturated slurry of acetoguanamine and water was heated to 90° C. and slowly cooled. The temperature dropped uniformly to about 35° C. at which point the temperature rose about 0.8° C. No additional temperature exotherm was noted as the slurry was cooled to 20° C.

*Example 4*

A super saturated slurry of acetoguanamine and water was cooled to a temperature of 40° C. The acetoguanamine was seperated from the slurry and found to contain less than 3 weight percent water.

*Example 5*

The procedure of Example 4 was repeated except that the separation was performed at a temperature of 30° C. The acetoguanamine was found to contain more than 30 weight percent water.

It can be seen that by following the present procedure there is produced anhydrous acetoguanamine having the desired particle size.

On the contrary acetoguanamine in its hydrate form contains a minimum of about 30 weight percent water, making drying a difficult matter. It also forms a fine powder and has a strong tendency to form agglomerates. Furthermore, the present procedure separates other impurities present in the reaction mixture including unused reactants, catalyst, solvent and by-products of the reaction from the acetoguanamine. For this reason it yields a high purity product.

I claim:
1. An improved process for the recovery of crystalline acetoguanamine from a system containing acetoguanamine and water which comprises separating the water and the acetoguanamine from each other at a temperature above about 35° C.
2. The process of claim 1 wherein the system containing acetoguanamine and water is a slurry.
3. The process of claim 1 wherein the separation is performed by centrifuging the system.
4. The process of claim 1 wherein the separation is performed by filtering the system.
5. The process of claim 1 wherein the acetoguanamine is prepared by reacting dicyandiamide and acetonitrile in an alkaline reaction medium.

References Cited

UNITED STATES PATENTS

| | | | |
|---|---|---|---|
| 2,302,162 | 11/1942 | Zerweck et al. | 260—249.9 |
| 2,408,694 | 10/1946 | Simons et al. | 260—249.9 X |
| 2,510,761 | 6/1950 | Simons | 260—249.9 |
| 2,696,307 | 12/1954 | Rush | 210—71 X |
| 2,735,850 | 2/1956 | Jones | 210—249.9 |

SAMIH N. ZAHARNA, *Primary Examiner.*

D. M. RIESS, *Assistant Examiner.*